(12) United States Patent
Sakaguchi et al.

(10) Patent No.: US 9,239,845 B2
(45) Date of Patent: Jan. 19, 2016

(54) BACKUP SYSTEM

(71) Applicant: Hitachi, Ltd., Tokyo (JP)

(72) Inventors: Takashi Sakaguchi, Tokyo (JP); Takamasa Sato, Tokyo (JP); Kensuke Narita, Tokyo (JP); Yosuke Katoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/423,872

(22) PCT Filed: Dec. 24, 2013

(86) PCT No.: PCT/JP2013/084430
§ 371 (c)(1),
(2) Date: Feb. 25, 2015

(87) PCT Pub. No.: WO2015/097737
PCT Pub. Date: Jul. 2, 2015

(65) Prior Publication Data
US 2015/0234860 A1    Aug. 20, 2015

(51) Int. Cl.
*G06F 17/30* (2006.01)
*G06F 11/14* (2006.01)

(52) U.S. Cl.
CPC ...... *G06F 17/30191* (2013.01); *G06F 11/1451* (2013.01); *G06F 17/30581* (2013.01); *G06F 2201/82* (2013.01)

(58) Field of Classification Search
None
See application file for complete search history.

(56) References Cited

U.S. PATENT DOCUMENTS

| 6,446,175 | B1 * | 9/2002 | West | G06F 11/1456 711/161 |
| 2004/0172509 | A1 | 9/2004 | Takeda et al. | |
| 2006/0195666 | A1 | 8/2006 | Maruyama et al. | |
| 2006/0271815 | A1 | 11/2006 | Mizuno et al. | |
| 2007/0254922 | A1 | 11/2007 | Hiraiwa et al. | |
| 2008/0104443 | A1 * | 5/2008 | Akutsu et al. | G06F 11/2058 714/6.12 |
| 2008/0244035 | A1 | 10/2008 | Horie | |
| 2009/0125691 | A1 | 5/2009 | Nakanishi | |
| 2010/0005260 | A1 | 1/2010 | Inoue et al. | |

FOREIGN PATENT DOCUMENTS

| JP | 2004-259079 A | 9/2004 |
| JP | 2006-236019 A | 9/2006 |
| JP | 2006-338064 A | 12/2006 |

(Continued)

*Primary Examiner* — Belix M Ortiz Ditren
(74) *Attorney, Agent, or Firm* — Volpe and Koenig, P.C.

(57) ABSTRACT

A backup copy from a first data volume to a second data volume is executed according to either a synchronous mode, in which write data is copied from the first data volume to the second data volume in synchronous with a write request, or an asynchronous mode, in which journal data of a first storage apparatus is reflected on the second data volume in asynchronous with the write request. A second storage apparatus acquires secondary load information representing its own load status, and transmits the information to the first storage apparatus. The first storage apparatus acquires primary load information representing its own load status, determines switching between the modes based on the secondary load information, the primary load information and mode information, and transmits determination information representing determination results to the second storage apparatus. When the determination information represents the switching from the asynchronous mode to the synchronous mode, the second storage apparatus acquires the journal data from the first storage apparatus and reflects the journal data on the second data volume.

5 Claims, 15 Drawing Sheets

(56) References Cited

FOREIGN PATENT DOCUMENTS

| | | |
|---|---|---|
| JP | 2007-293652 A | 11/2007 |
| JP | 2008-250695 A | 10/2008 |
| JP | 2009-122873 A | 6/2009 |
| JP | 2010-015301 A | 1/2010 |

\* cited by examiner

Pair formation table

| P-VOL# | S-VOL# | Pair ID | Response time threshold value (ms) | P-MPB operating rate threshold value (%) |
|---|---|---|---|---|
| 0 | 0 | 00001 | 100 | 30 |
| 1 | 1 | 00001 | 500 | 30 |
| .. | .. | .. | .. | .. |
| Y | X | 00001 | 500 | 20 |

| P-VOL # | P-MPB operating rate (%) | Transfer response time (ms) | Transfer rate (Mb/s) | S-VOL load (IOPS) | S-MPB operating rate (%) | Mode | Previous switching time point | Frequency (time/h) |
|---|---|---|---|---|---|---|---|---|
| 0 | 30 | 5 | 100 | 100 | 10 | Asynchronous | 23:00:00 | 3 |
| 1 | 30 | 100 | 200 | 200 | 30 | Synchronous | 13:14:45 | 1 |
| .. | .. | .. | .. | .. | .. | .. | | |
| Y | 20 | 10 | 100 | 100 | 10 | Synchronous | 21:19:00 | 1 |

400

Mode switching management table

S site: S mode switching processing

P site: P mode switching processing

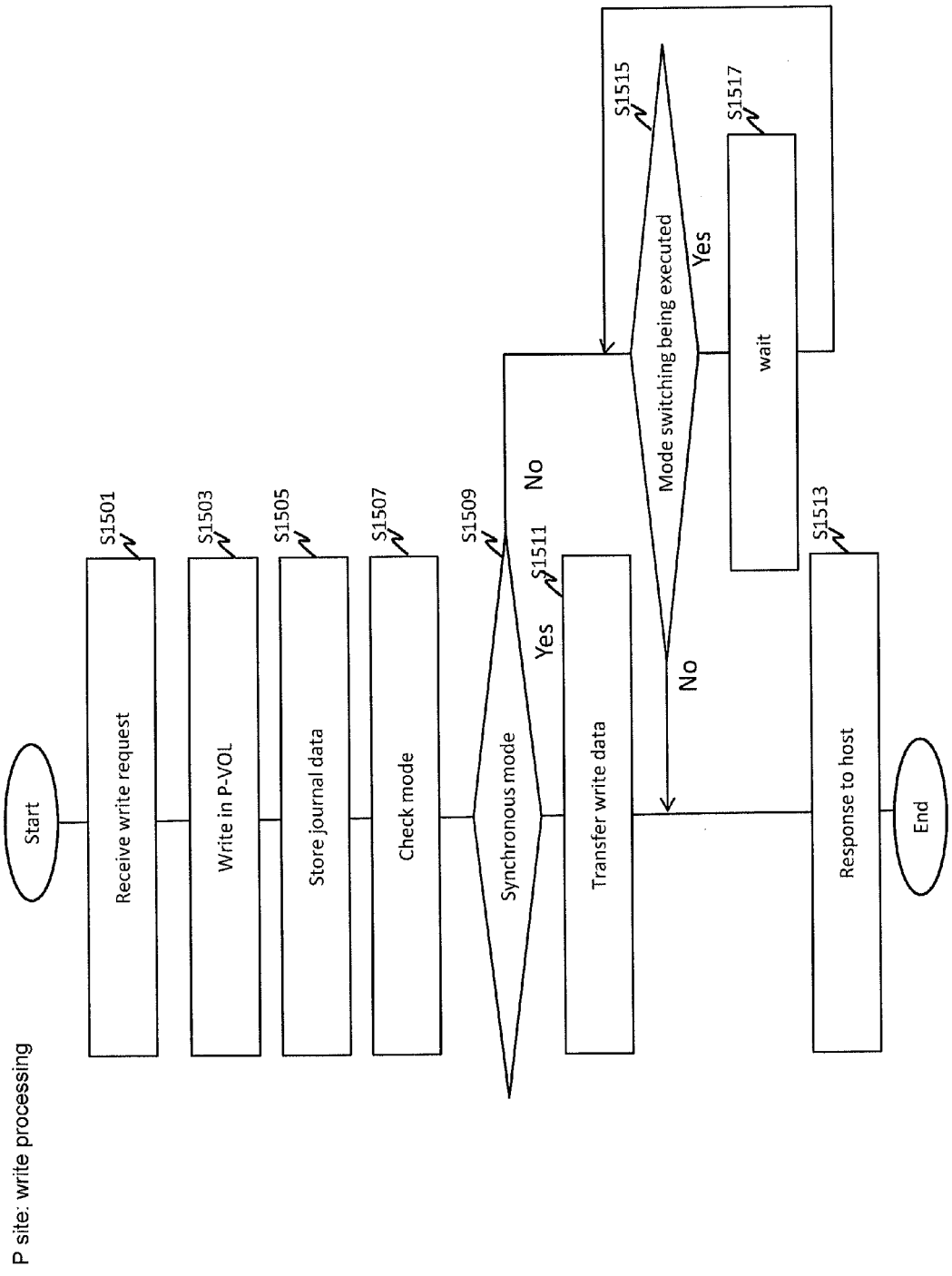

BACKUP SYSTEM

TECHNICAL FIELD

This invention relates to a backup system for backing up data in a storage apparatus to another storage apparatus.

BACKGROUND ART

A backup system that has a secondary storage apparatus for backing up data, in preparation for a malfunction or the like of a primary storage apparatus, is known. As a backup method of the data in the backup system, for example, the method disclosed in PTL 1 is known.

According to this backup method, a mode for storing backup data in a data volume on the primary side to a data volume on the secondary side may be a synchronous mode (synchronous remote copy) that allows the data volumes on the primary side and the secondary side to be synchronous with each other, or an asynchronous mode (asynchronous remote copy) that allows the data in the data volume on the secondary side to asynchronously follow the data in the data volume on the primary side. According to this backup method, a first storage apparatus acts as a main body to execute data transfer in both of the synchronous mode and the asynchronous mode.

CITATION LIST

Patent Literature

[PTL 1]
Japanese Patent Application Laid-open No. 2009-122873

SUMMARY OF INVENTION

Technical Problem

Meanwhile, when the main body that transfers the data changes depending on the mode, that is, the synchronous mode or the asynchronous mode, there is the possibility that consistency of the data, such as data transfer order, cannot be maintained when the modes are switched between each other.

Solution to Problem

In order to solve the above-described problem, a backup system according to an aspect of the present invention includes: a first storage apparatus that is configured to be coupled to a host computer and to have a first data volume; and a second storage apparatus that is configured to have a second data volume. The first storage apparatus is configured to store mode information representing a mode of a backup copy from the first data volume to the second data volume, copy write data from the first data volume to the second data volume in synchronous with a write request when the mode information represents a synchronous mode, and generate journal data based on the write data when the mode information represents an asynchronous mode. The second storage apparatus is configured to store the mode information, receive the write data from the first storage apparatus and write the data in the first data volume when the mode information represents the synchronous mode, and acquire the journal data from the first storage apparatus in asynchronous with the write request and reflect the journal data on the second data volume when the mode information represents the asynchronous mode. The second storage apparatus is configured to acquire secondary load information representing its own load status and transmit the information to the first storage apparatus, and the first storage apparatus is configured to acquire primary load information representing its own load status, determine switching between the modes based on the secondary load information, the primary load information, and the mode information, and to transmit determination information representing determination results to the second storage apparatus. The second storage apparatus is configured to receive the determination information, and to acquire the journal data from the first storage apparatus and reflect the journal data on the second data volume when the determination information represents the switching from the asynchronous mode to the synchronous mode.

Advantageous Effects of Invention

According to the aspect of the present invention, it is possible to maintain the consistency of the data even when the switching to the synchronous mode or the asynchronous mode is made.

BRIEF DESCRIPTION OF DRAWINGS

FIG. 3 illustrates a pair formation table 300.

FIG. 4 illustrates a mode switching management table 400.

FIG. 15 is a flowchart of the write processing in the primary site 1a according to the example 3.

DESCRIPTION OF EMBODIMENTS

Figure 1:
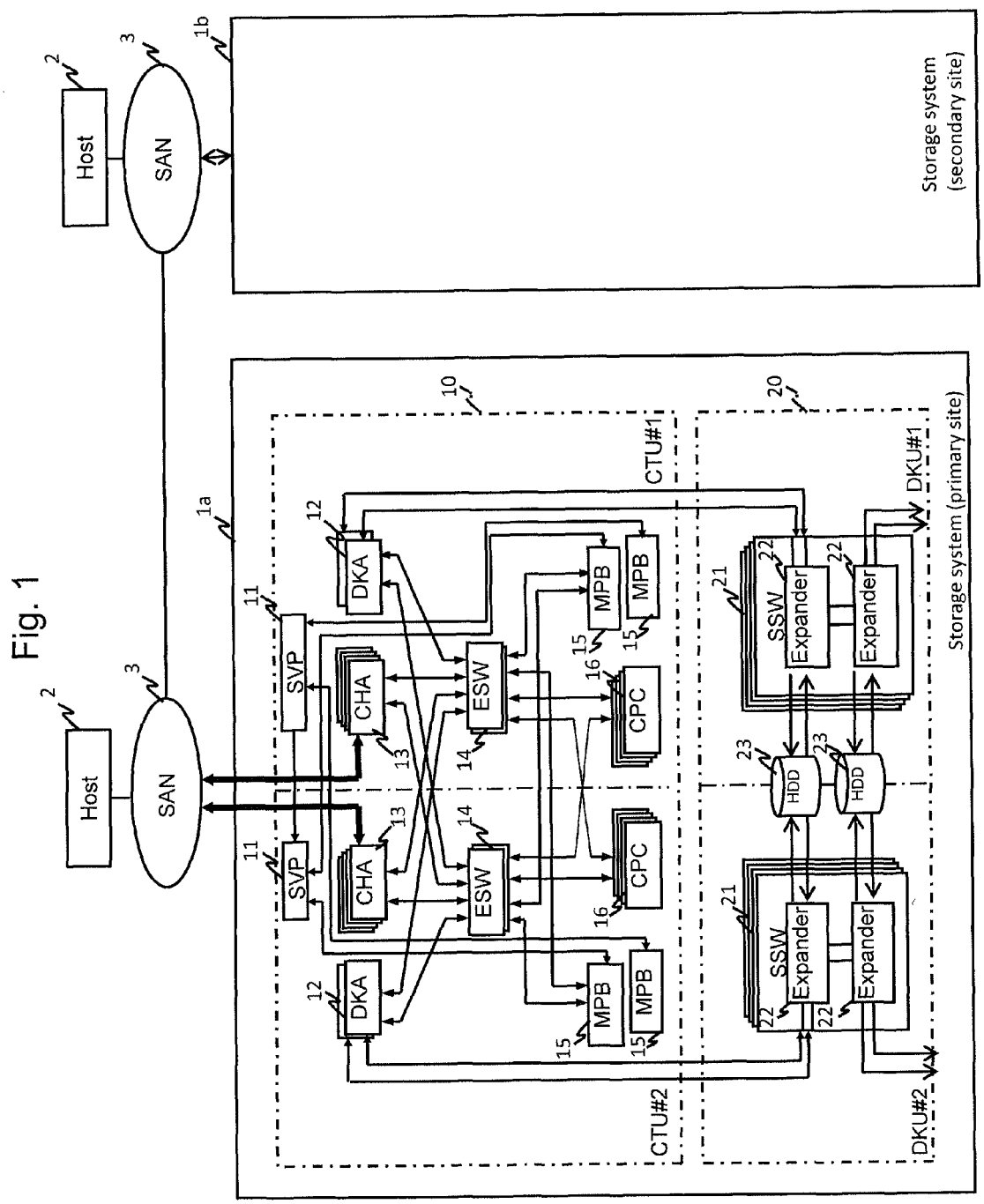
FIG. 1 illustrates the configuration of a remote copy system according to an example 1.

Incidentally, in the following explanation, the explanation on information will be given by the expression such as an "aaa table", but the information may be expressed without using a data structure such as the table. For this reason, the "aaa table" or the like may be referred to as "aaa information" so as to indicate that the information is independent of the data structure.

In addition, it is possible to replace the terms of "information", "identifier", and "ID" with each other, which are used at the time of explaining the contents of the information.

Although, in the following explanation, the explanation may be given by using a "program" as the subject, the explanation of processing using the "program" as the subject may be regarded as the explanation using a microprocessor as the subject, because the program is executed by the microprocessor so as to execute predetermined processing by using memory and a communication interface. Alternatively, it may be regarded as the processing executed by an apparatus containing the microprocessor. Further, a part of or all the processing executed by the program may be realized by dedicated hardware. Furthermore, the program may be installed in a computer system by a program distribution server or a storage media that can be read by the computer system.

In the drawings, the same reference numerals will be used to explain the common components. Particular numbers and the like are added after the numbers of the common elements, such as 1a, 1b, 1A, 2B and the like, so as to identify the respective elements. Incidentally, the explanation may be given by omitting the numbers and the like, as needed.

Hereinafter, examples of the present invention will be explained with reference to the drawings and the like. The following examples illustrate specific examples of the contents of the present invention, and it is to be understood that the present invention is not limited to the examples, and that various changes and modifications may be made by a person skilled in the art within the technical scope disclosed herein. As an example of a backup system of the present invention, a remote copy system that is configured by a plurality of storage systems installed at remote places will be explained in the following explanation, and a data backup copy between the storage systems will be explained as a remote copy. However, it is not necessary that the storage systems are installed at the remote places.

Example 1

Hereinafter, the configuration of a remote copy system according to the example 1 will be explained.

FIG. 1 illustrates the configuration of a remote copy system according to the example 1.

The remote copy system according to the example 1 has a plurality of storage systems 1. Each of the storage systems 1 has a communication network 3 such as a SAN (Storage Area Network) and is coupled to a host computer (hereinafter referred to as a host) 2. The storage systems 1 are coupled to each other as the communication networks 3 of the storage systems 1 are coupled to each other. Incidentally, the communication network 3 is not limited to the SAN only, and may be another network such as the Internet, for example. Further, the plurality of storage systems 1 may be coupled to each other via another communication network such as a WAN (Wide Area Network), other than the SAN. A remote copy of the data is executed between the plurality of storage systems 1 in the remote copy system. It is supposed that the remote copy system according to this example has the two storage systems 1. In the following explanation, the storage system 1 as a copy source of the data is referred to as a primary site 1a, and the storage system 1 as a copy destination of the data is referred to as a secondary site 1b, both of which basically have the same configuration. Hereinafter, the configuration of one of the storage systems 1 will be explained. However, the plurality of storage systems that form the remote copy system may have the different configurations.

The storage system 1 has a control apparatus (CTU) 10 and a storage apparatus 20. The control apparatus 10 is coupled to the storage apparatus 20 and the host 2.

The storage apparatus 20 has disk units and drives. The storage apparatus 20 is made redundant by a plurality of disk units (DKU). According to this example, the storage apparatus 20 is made redundant by the two disk units #1 and 2. Each disk unit #1 (#2) has a plurality of switches. According to this example, a SSW (SAS Switch) 21 that is provided with a plurality of expanders 22 is used as the switch. There may be one SSW 21 and one expander 22. Each disk unit #1 (or #2) is coupled to a controller unit #1 (or #2) and the drives via the expanders 22 in its inside. Each drive is a physical storage device, and is formed by a HDD (Hard Disk Drive) 23 according to this example. For example, a SAS (Serial Attached Small Computer System Interface)—HDD (Hard Disk Drive), a SATA (Serial Advanced Technology Attachment)—HDD or the like may be used as the HDD 23. Further, a semiconductor storage device such as a SSD (Solid State Drive) may be used as the drive, instead of the HDD 23. A RAID (Redundant Arrays of Inexpensive Disks) group may be formed by a plurality of the drives 23. Based on one drive 23 or the plurality of drives 23 that form one RAID group, one or a plurality of volumes (LU: Logical Unit) are provided to the host 2. The volume to be provided to the host 2 may be a virtual volume (a volume according to Thin Provisioning, for example), instead of the volume based on the drive 23. According to this example, the volume to be provided to the host 2 is collectively referred to as a "data VOL", the data VOL that the primary site 1a has is referred to as a "primary VOL (P-VOL)", and the data VOL that the secondary site 1b has is referred to as a "secondary VOL (S-VOL)", respectively. Further, a pair of the P-VOL as the copy source and the S-VOL as the copy destination in the remote copy is referred to as "pair VOLs". Furthermore, a volume that is associated with the data VOL and that stores journal data, which is data added with control information such as order of updating the data, is collectively referred to as a "journal VOL", the journal VOL associated with the P-VOL is referred to as a "P-JVOL", and the journal VOL associated with the S-VOL is referred to as a "S-JVOL", respectively.

The control apparatus 10 is made redundant by the two independent controller units #1 and #2. The respective controller units #1 (#2) basically have the same configuration. Therefore, an explanation will be mainly given to the configuration of the controller unit #1. However, the two controller units #1 (#2) may have the different configurations. Further, according to this example, the control apparatus 10 is made redundant by the two controller units #1 and #2, but this is not restrictive. The control apparatus 10 may be made redundant by three or more controller units, or may be formed by only one controller unit.

The controller unit #1 has one or more service processors (SVP: Service Processor) 11, one or more disk adapters (DKA: Disk Adapter) 12, one or more channel adapters (CHA: Channel Adapter) 13, one or more switches (ESW: PCI-Express Switch Adapter) 14, one or more microprocessors (MPB: Micro Processor Blade) 15, and one or more cache memories (CPC: Cash Path Control Adapter) 16. The respective components of the two controller units #1 and #2 are coupled to each other by buses via the switch 14. The cache memory 16 has a battery, and stores programs and data for controlling the storage system 1. According to this example, the cache memory 16 has various information such as pair formation information, mode switching management information and the like, and various programs such as a remote copy control program, a write processing program and the like. The microprocessor 15 controls the storage system 1 according to the programs stored in the cache memory 16. The channel adapter 13 communicates with the host 2 and another storage system 1. The disk adapter 12 in the controller unit #1 is coupled to each expander 22 in the disk unit #1, and communicates with the disk unit #1. Both of the controller units #1 and #2 can gain access to the drives 23. Incidentally, according to this example, the ESW is used as the switch 14 for connecting the respective components, but this is not restrictive.

Figure 2:
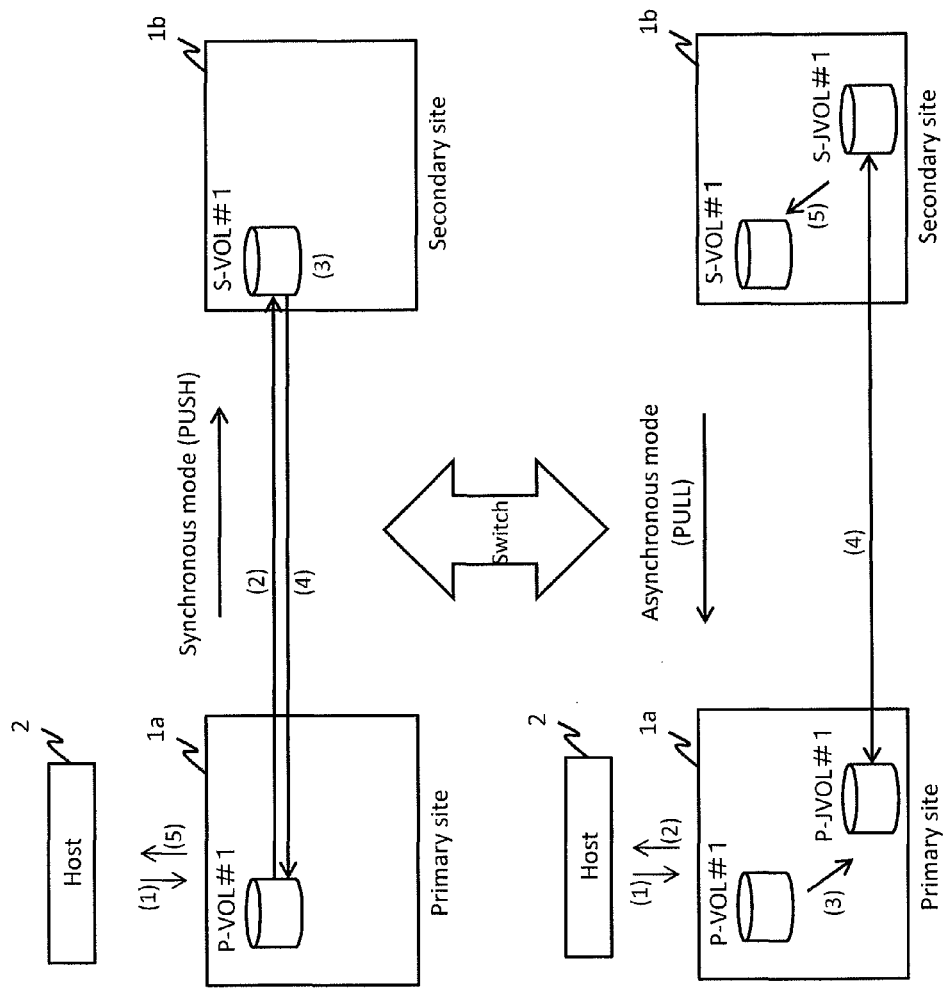
FIG. 2 is a view explaining the outline of a remote copy executed by the remote copy system according to the example 1.

FIG. 2 is a view explaining the outline of the remote copy executed by the remote copy system according to the example 1.

An explanation will be given to the case where the remote copy is executed from P-VOL#1 of the primary site 1a to S-VOL#1 of the secondary site 1b.

The remote copy system according to this example employs a synchronous mode or an asynchronous mode, as a mode of the remote copy. According to the synchronous mode, the primary site 1a reports to the host 2 that writing is completed after the writing to the P-VOL and the S-VOL is completed in response to a write request from the host 2. In this example, data transfer between the sites according to the synchronous mode is executed in a PUSH type manner, in which the primary site 1a acts as a main body. Specifically, the following processing will be executed, for example.

(1) When receiving the write request specifying the P-VOL#1 from the host 2, the primary site 1a writes data of a write target in the P-VOL#1. In the following explanation, the data of the write target will be referred to as write data.

(2) The primary site 1a transfers the write data that is written in the P-VOL#1 to the secondary site 1b.

(3) The secondary site 1b receives the write data and writes it in the S-VOL#1.

(4) The secondary site 1b transmits a write completion report of the write data in the S-VOL#1 to the primary site 1a.

(5) The primary site 1a receives the write completion report and transmits a report to the effect that the writing of the write data is completed to the host 2.

According to the asynchronous mode, on the other hand, the journal volume associated with each data VOL is generated in each storage system 1. In response to the write request from the host 2, the primary site 1a adds the control information such as the order of updating to the received write data, and stores it as the journal data in the journal volume. In this example, the data transfer between the sites according to the asynchronous mode is executed in a PULL type manner, in which the secondary site 1b acts as a main body. Specifically, the following processing will be executed, for example.

(1) When receiving the write request specifying the P-VOL#1 from the host 2, the primary site 1a writes the write data in the P-VOL#1.

(2) The primary site 1a reports to the host 2 that the writing of the write data is completed.

(3) The primary site 1a adds the control information to the write data, and writes it as the journal data in a journal volume (P-JVOL#1) associated with the P-VOL#1.

(4) Thereafter, the secondary site 1b transmits a data transfer request to the primary site 1a at a predetermined timing, reads the journal data written in the P-JVOL#1, and writes it in a journal volume S-JVOL#1 that is associated with its own S-VOL#1.

(5) Based on the journal data written in the S-JVOL#1, the secondary site 1b updates the S-VOL#1.

According to this example, the primary site 1a switches between the modes when executing the remote copy between the sites. Specifically, for example, the primary site 1a switches the mode of the remote copy between the "synchronous mode" and the "asynchronous mode", based on primary load information that is about a load of the P-VOL or the like on the primary site side, and secondary load information that is about a load of the S-VOL or the like is on the secondary site side.

FIG. 3 illustrates a pair formation table 300.

The pair formation table 300 is the table for managing the pair VOLs at the time of the remote copy. For example, the pair formation table 300 is configured by a user via a service processor 11, and is stored in the cache memory 16 of the primary site 1a. The pair formation table 300 has entries for the respective P-VOLs. Each entry has a P-VOL# 301 representing an identification number of the particular P-VOL, an S-VOL# 303 representing an identification number of the S-VOL that forms a pair with the particular P-VOL, a pair ID 305 representing an identification number of the pair VOLs including the particular P-VOL, a response time threshold value 307 representing a threshold value of a response time of the particular P-VOL, and a P-MPB operating rate threshold value 309 representing a threshold value of an operating rate of the microprocessor 15 of the primary site 1a. Incidentally, the response time of the P-VOL means a time until the processing (1) to (5) is completed according to the synchronous mode. Namely, the response time of the P-VOL is a time from when the primary site 1a receives the write request from the host 2 with respect to the particular P-VOL, until when the writing of the write data in the P-VOL and the S-VOL that forms a pair with the P-VOL is completed and the report to the effect that the writing is completed is transmitted to the host 2. The threshold value of the response time of the P-VOL is configured by the user. In addition, the threshold value of the P-MPB operating rate is also configured by the user.

FIG. 4 illustrates a mode switching management table 400.

The mode switching management table 400 is the table for managing information required when the mode of the remote copy is switched. The mode switching management table 400 is stored in the cache memory 16 of the primary site 1a, for example. The mode switching management table 400 has entries for the respective P-VOLs. Each entry has a P-VOL# 401 representing an identification number of the particular P-VOL, a P-MPB operating rate 403 representing an operating rate of the microprocessor 15 of the primary site 1a, a transfer response time 405 representing a time required for the data transfer between the pair VOLs including the particular P-VOL, a transfer rate 407 representing a data transfer rate between the pair VOLs including the particular P-VOL, an S-VOL load 409 representing a load status of the S-VOL that forms a pair with the particular P-VOL, an S-MPB operating rate 411 representing an operating rate of the microprocessor 15 of the secondary site 1b, a mode 413 representing mode information of the current remote copy, a previous switching time point 415 representing a time point when the last mode switching is executed, and a frequency 417 representing a number of times of the mode switching per hour. Incidentally, the transfer response time 405 is the time until when a response from the secondary site 1b is made in response to the request from the primary site 1a, when executing the data transfer from the P-VOL to the SVOL, for example. Further, the transfer rate 407 is the data transfer amount per second from the P-VOL to the SVOL, for example. Furthermore, the S-VOL load 409 is the I/O (Input or Output) processing amount of the S-VOL per second, for example.

Here, the P-MPB operating rate and the transfer response time are defined as the primary load information acquired in the primary site 1a. Average values of the respective values that are measured by the primary site 1a at regular intervals are respectively stored in the fields of the P-MPB operating rate 403 and the transfer response time 405.

Moreover, the transfer rate, the S-VOL load, and the S-MPB operating rate are defined as the secondary load information acquired in the secondary site 1*b*. Average values of the respective values that are measured by the secondary site 1*b* at regular intervals are respectively stored in the fields of the transfer rate 407, the S-VOL load 409, and the S-MPB operating rate 411.

Based on the information of the mode switching management table 400, the microprocessor 15 of the primary site 1*a*, being in the asynchronous mode, estimates the response time of the P-VOL at the time of the synchronous mode and defines it as an estimated response time. The estimated response time of the P-VOL at the time of the asynchronous mode is calculated by adding, for example, a host response time from when the write request is made by the host 2 to the P-VOL until the response is made to the host 2, a data transfer time from the primary site 1*a* to the secondary site 1*b*, and a margin representing a predetermined time, for each P-VOL. Specifically, the data transfer time from the primary site 1*a* to the secondary site 1*b* is calculated based on the transfer rate 407, the S-VOL load 409, and the S-MPB operating rate 411, for example. Incidentally, the host response time may be acquired from the host 2 by the primary site 1*a*.

Hereinafter, remote copy control processing of the pair VOLs according to this example will be explained. This processing is executed when the microprocessor 15 of the primary site 1*a* and the microprocessor 15 of the secondary site 1*b* execute a remote copy control program stored in the corresponding cache memory 16. This processing is executed repeatedly at regular intervals or at irregular intervals. Hereinafter, in FIGS. 5 and 6, the processing on the secondary site 1*b* side will be explained, and in FIGS. 7 to 9, the processing on the primary site 1*a* side will be explained. Incidentally, the secondary site 1*b* stores in the cache memory 16 the mode information representing the current mode of the remote copy between the pair VOLs including its own volume.

Figure 5:
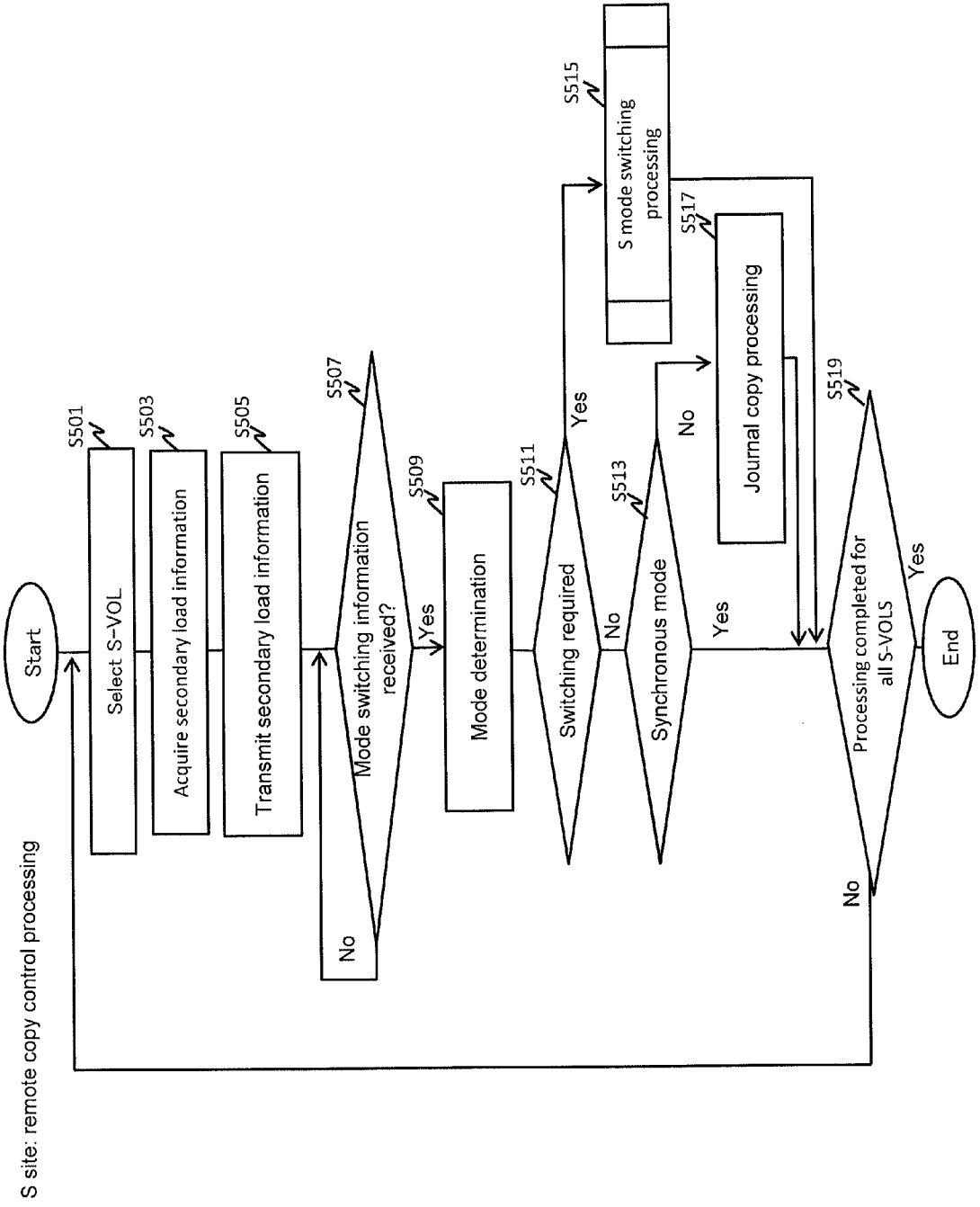
FIG. 5 is a flowchart of remote copy control processing on a secondary site 1b side.

FIG. 5 is a flowchart of the remote copy control processing on the secondary site 1*b* side.

In S501, the program selects one S-VOL from the S-VOLs of the secondary site 1*b*. It should be noted that, in the explanation on the remote copy control processing (FIGS. 5 to 9), the S-VOL that is selected here is referred to as a target S-VOL, the P-VOL that makes a pair with the target S-VOL is referred to as a target P-VOL, and the pair of the target P-VOL and the target S-VOL is referred to as target pair VOLs.

In S503, the program acquires the secondary load information of the target S-VOL. As described above, the secondary load information includes the transfer rate representing the data transfer rate between the pair VOLs, the S-VOL load representing the load status of the S-VOL, the S-MP operating rate representing the operating rate of the microprocessor of the secondary site 1*b*, and the like.

In S505, the program transmits the secondary load information that is acquired in S503 to the primary site 1*a*.

In S507, the program determines whether mode switching information of the target pair VOLs is received from the primary site 1*a* or not. Here, the mode switching information is the information about whether the mode switching of the target pair VOLs is required or not, for example (refer to FIG. 7). Incidentally, the mode switching information may represent the mode after the mode switching. When the determination result is true (Yes in S507), the program allows the processing to proceed to S509. Meanwhile, when the determination result is false (No in S507), the program repeats this processing at prescribed time intervals.

In S509, the program executes mode determination. Here, the program acquires information necessary for the mode switching, based on the current mode of the target pair VOLs. Specifically, when the current mode of the target pair VOLs is the synchronous mode, the program acquires the position where the copy of the journal data to be transferred to the S-JVOL is started. When the current mode of the target pair VOLs is the asynchronous mode, the program acquires the position where the copy of the journal data to be transferred to the S-JVOL is ended.

In S511, the program determines whether the mode switching is required or not, based on the mode switching information in S507.

When the determination result is true (Yes in S511), the program allows the processing to proceed to S515, executes mode switching processing on the secondary site 1*b* side (S mode switching processing), and allows the processing to proceed to S519. The S mode switching processing will be described later. Meanwhile, when the determination result is false (No in S511), the program allows the processing to proceed to S513, and determines whether the current mode is the synchronous mode or not, based on the mode switching information in S507.

When the determination result is true (Yes in S513), the program allows the processing to proceed to S519. Meanwhile, when the determination result is false (No in S513), the program allows the processing to proceed to S517, and executes journal copy processing. In the journal copy processing, the program transmits the data transfer request of the P-JVOL that is associated with the target P-VOL to the primary site 1*a*, so as to copy it to the S-JVOL associated with the target S-VOL. At this time, the copy from the P-JVOL to the S-JVOL starts from the position determined in S509.

In S519, the program determines whether the processing from S501 to 517 is completed or not for all the S-VOLs in the secondary site 1*b*. When the determination result is true (Yes in S519), the program terminates the processing. Meanwhile, when the determination result is false (No in S519), the program allows the processing to return to S501.

By the above-described processing, the primary site 1*a* can acquire the information (secondary load information) of the respective S-VOLs of the secondary site 1*b*. This makes it possible for the primary site 1*a* to determine whether the mode switching is required or not.

In addition, the secondary site acquires the information about whether the mode switching is required or not from the primary site 1*a*, so as to execute the S mode switching processing based on this information.

Further, when the mode switching is not required at the time of the asynchronous mode, it is possible to acquire the journal data from the P-JVOL and to copy it to its own S-JVOL.

Figure 6:
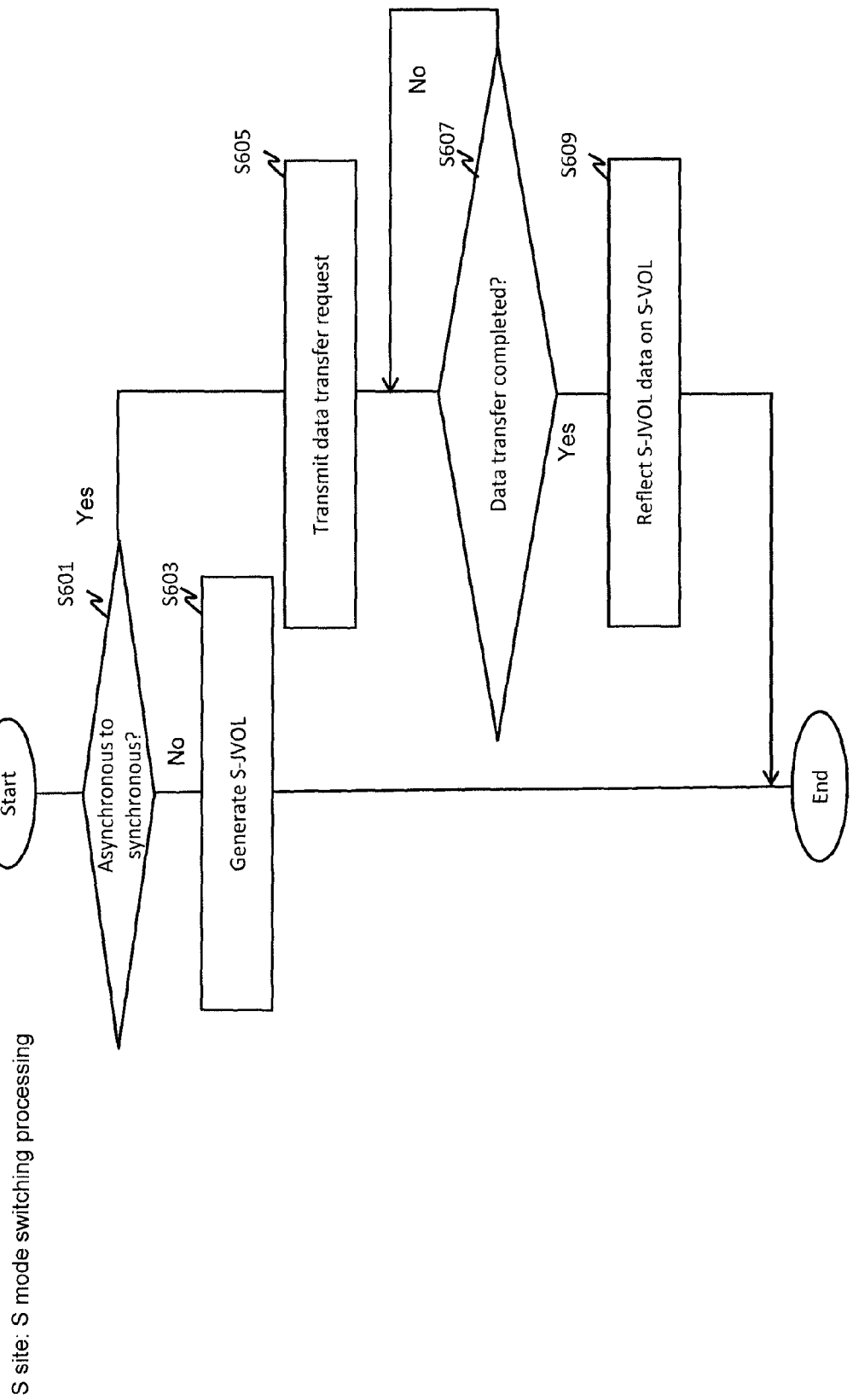
FIG. 6 is a flowchart of mode switching processing on the secondary site 1b side.

FIG. 6 is a flowchart of the S mode switching processing when the mode switching is executed on the secondary site 1*b* side. This is the processing of S515 in FIG. 5.

In S601, the program determines whether the mode switching of the target pair VOLs is from the asynchronous mode to the synchronous mode or not. When the determination result is true (Yes in S601), the program allows the processing to proceed to S605. Meanwhile, when the determination result is false (No in S601), the program allows the processing to proceed to S603.

In S603, the program generates the S-JVOL corresponding to the target S-VOL, and terminates the processing.

In S605, the program transmits to the primary site 1*a* the data transfer request of the journal data that is stored in the P-JVOL corresponding to the target P-VOL.

In S607, the program determines whether the transfer of the journal data in the P-JVOL, based on the data transfer request of S605, is completed or not. Specifically, the program determines whether a transfer completion report of the journal data in the P-JVOL is received from the primary site 1a or not. When the determination result is true (Yes in S607), the program allows the processing to proceed to S609. Meanwhile, when the determination result is false (No in S607), the program repeats this processing. Incidentally, the transferred journal data is stored in the S-JVOL corresponding to the target S-VOL.

In S609, the program reflects the journal data in the S-JVOL on the target S-VOL.

According to the above-described processing, the S-JVOL corresponding to the S-VOL can be generated when the switching is made from the synchronous mode to the asynchronous mode. When the switching is made from the asynchronous mode to the synchronous mode, all the data left in the P-JVOL is copied to the S-JVOL, and then the journal data of the S-JVOL can be reflected on the S-VOL. Thereby, the contents of the P-VOL and the S-VOL that form a pair agree with each other, and the switching to the synchronous mode is made possible.

Figure 7:
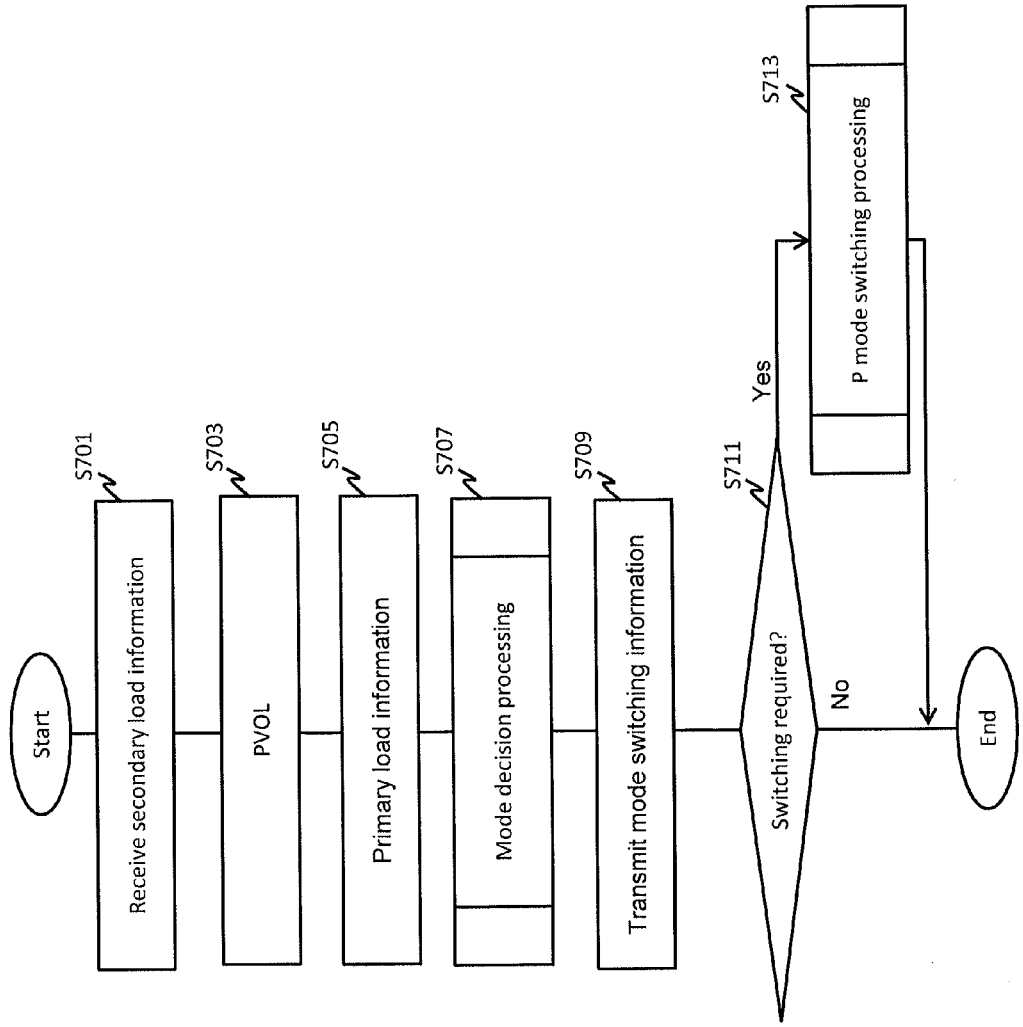
FIG. 7 is a flowchart of remote copy control processing on a primary site 1a side.

FIG. 7 is a flowchart of the remote copy control processing on the primary site 1a side.

In S701, the program receives the secondary load information of the target S-VOL from the secondary site 1b, and stores it in the mode switching management table 400. Specifically, this secondary load information is the information transmitted from the secondary site 1b in S505 in FIG. 5, for example.

In S703, the program refers to the pair formation table 300, and acquires the P-VOL (target P-VOL) that forms a pair with the target S-VOL.

In S705, the program acquires the primary load information of the target P-VOL and stores it in the mode switching management table 400. As described above, the primary load information includes the P-MP operating rate representing the operating rate of the microprocessor 15 of the primary site 1a, the transfer response time between the pair volumes and the like.

In S707, the program executes mode decision processing. The mode decision processing will be described later. In the mode decision processing, the mode switching information representing whether the mode switching of the target pair VOLs is required or not is acquired.

In S709, the program transmits the mode switching information of the target pair VOLs to the secondary site 1b. Incidentally, as described above, the mode switching information is the information about whether the mode switching of the target pair VOLs is required or not, for example.

In S711, the program determines whether the mode switching is required or not, based on the mode switching information of S709. When the determination result is true (Yes in S711), the program allows the processing to proceed to S713. Meanwhile, when the determination result is false (No in S711), the program terminates the processing.

In S713, the program executes the mode switching processing (P mode switching processing) on the primary site 1a side, and terminates the processing. The P mode switching processing will be described later.

By the above-described processing, the primary site 1a can acquire the information (secondary load information) of the respective S-VOLs of the secondary site 1b. This makes it possible for the primary site 1a to determine whether the mode switching is required or not.

In addition, the information about whether the mode switching is required or not can be transmitted from the primary site 1a to the secondary site 1b. Based on this information, the secondary site 1b can execute the mode switching processing.

Figure 8:
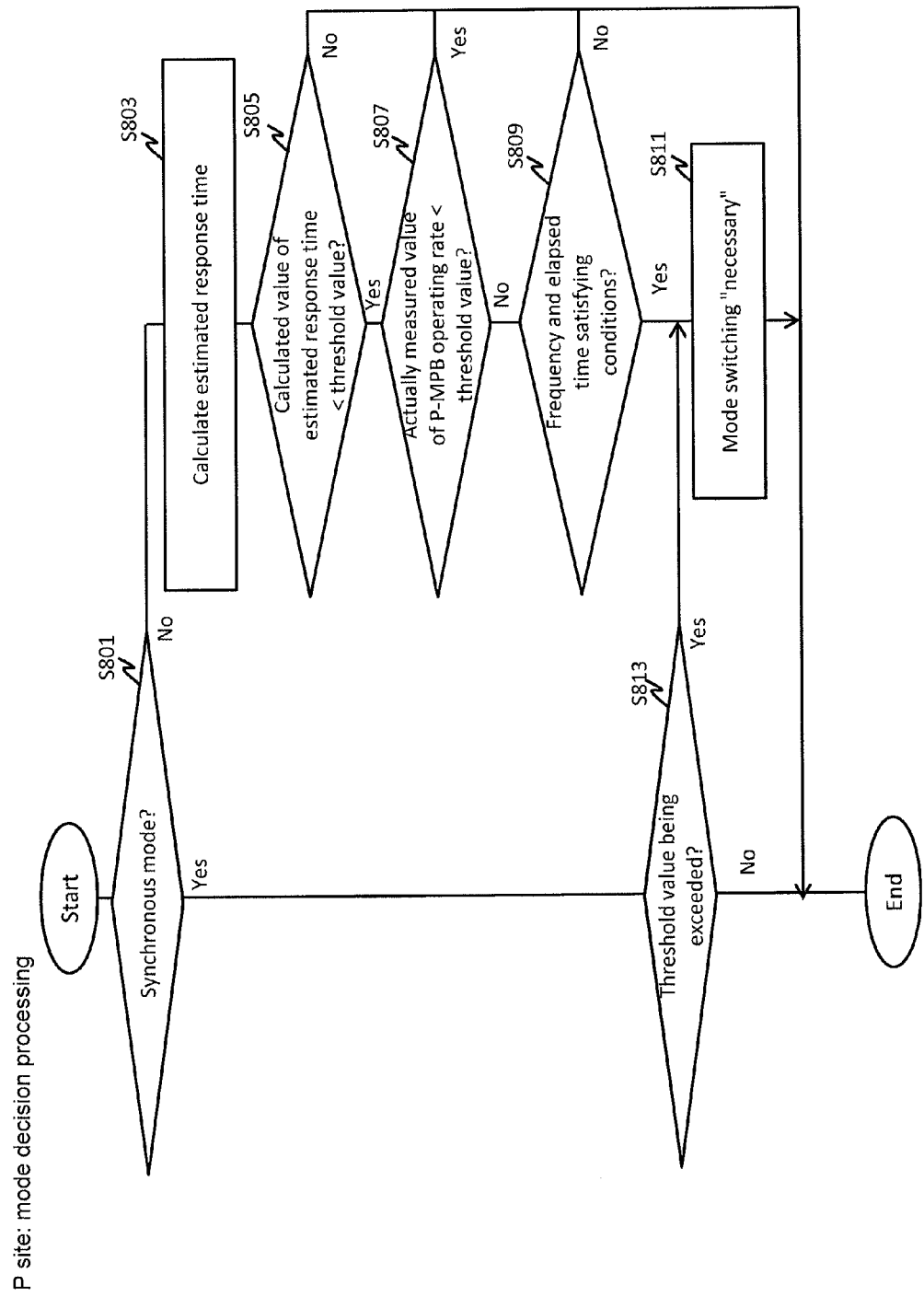
FIG. 8 is a flowchart of mode decision processing.

FIG. 8 is a flowchart of the mode decision processing. This is the processing of S707 in FIG. 7.

In S801, the program determines whether the current mode of the target pair VOLs is the synchronous mode or not, based on the mode switching management table 400. When the determination result is true (Yes in S801), the program allows the processing to proceed to S813. Meanwhile, when the determination result is false (No in S801), the program allows the processing to proceed to S803.

In S803, the program calculates the estimated response time of the target P-VOL. Incidentally, as described above, the estimated response time of the target P-VOL is calculated by adding, for example, the host response time, the data transfer time from the primary site 1a to the secondary site 1b, and the margin.

In S805, the program determines whether the value calculated in S803 (calculated value) exceeds a threshold value or not, with regard to the estimated response time of the target P-VOL. Here, the threshold value is the response time threshold value 307 corresponding to the particular P-VOL in the pair formation table 300. When the determination result is true (Yes in S805), the program allows the processing to proceed to S807. Meanwhile, when the determination result is false (No in S805), the program terminates the processing.

In S807, the program determines whether the operating rate of the microprocessor 15 of the primary site 1a is less than a threshold value or not, with regard to the target P-VOL. Here, the threshold value is the P-MPB operating rate threshold value 309 corresponding to the target P-VOL, in the pair formation table 300. In addition, an actually measured value of the operating rate of the microprocessor 15 of the primary site 1a is the P-MPB operating rate 403 corresponding to the target P-VOL in the mode switching management table 400. When the determination result is true (Yes in S807), the program terminates the processing. Meanwhile, when the determination result is false (No in S807), the program allows the processing to proceed to S809.

In S809, the program determines whether a frequency and an elapsed time of the mode switching satisfy conditions or not. The frequency of the mode switching is, for example, the frequency 417 corresponding to the target P-VOL in the mode switching management table 400. Further, the elapsed time of the mode switching is, for example, the elapsed time from the previous switching time point 415, corresponding to the target P-VOL in the mode switching management table 400, until the current time point. Here, the conditions of the frequency and the elapsed time are that the frequency is less than the predetermined frequency threshold value, and that the elapsed time is more than the predetermined elapsed time threshold value.

In S811, the program judges that the mode switching of the target pair VOLs is necessary (mode switching "necessary").

In S813, the program refers to the pair formation table 300, and determines whether the response time of the target P-VOL exceeds the response time threshold value 307 or not. As described above, the response time of the target P-VOL is the time from when the primary site 1a receives the write request from the host 2 with respect to the target P-VOL, until when the writing of the write data in the target P-VOL and the target S-VOL is completed and the report to the effect that the writing is completed is transmitted to the host 2, at the time of the synchronous mode. When the determination result is true (Yes in S813), the program allows the processing to proceed to S811. Meanwhile, when the determination result is false (No in S813), the program terminates the processing.

By the above-described processing, it is possible for the remote copy system according to this example to guarantee the response time of the P-VOL by executing the appropriate mode switching. Further, based on the primary load information that is measured on the primary site 1a side and the secondary load information that is measured on the secondary site 1b side, it is possible to appropriately judge the pair VOLs that require the mode switching. The details are as follows.

Based on the actually measured value of the response time of the P-VOL at the time of the synchronous mode, the primary site 1a can execute the switching from the synchronous mode to the asynchronous mode appropriately. This makes it possible to reduce the load that is applied to the primary site 1a and the secondary site 1b, at the time of copying between the pair VOLs.

By estimating the response time of the P-VOL (estimated response time) at the time of the synchronous mode, the primary site 1a, being in the asynchronous mode, can execute the switching from the asynchronous mode to the synchronous mode appropriately. Specifically, based on the secondary load information, that is, the transfer rate 407, the S-VOL load 409 and the S-MPB operating rate 411 in the mode switching management table 400, the response time of the P-VOL can be estimated, even at the time of the asynchronous mode.

Further, based on the operating rate of the microprocessor 15 on the primary site 1a side, the primary site 1a can execute the switching from the asynchronous mode to the synchronous mode appropriately.

Furthermore, in consideration of the frequency and the time of the mode switching, the primary site 1a can execute the switching from the asynchronous mode to the synchronous mode appropriately.

Figure 9:
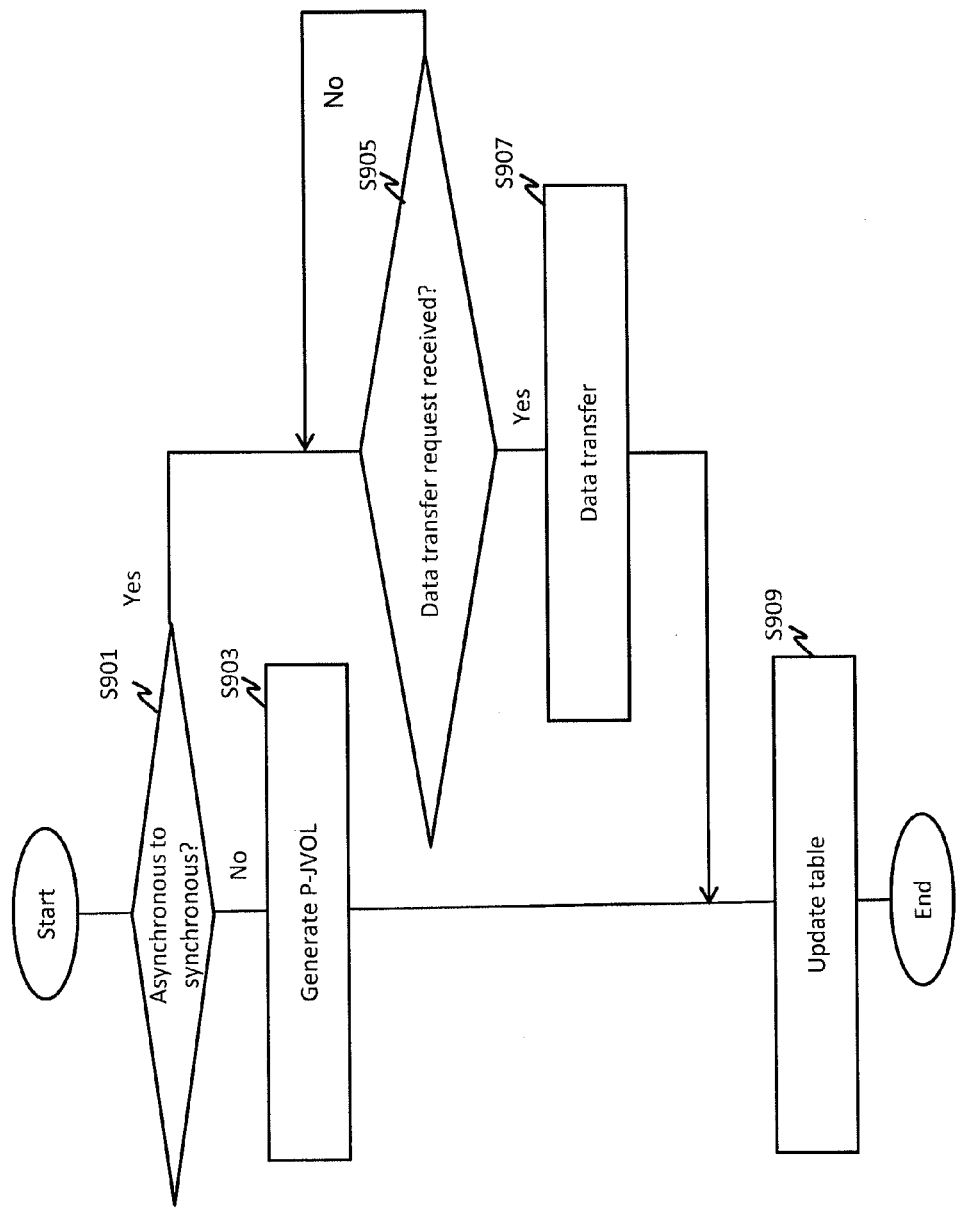
FIG. 9 is a flowchart of the mode switching processing on the primary site 1a side.

FIG. 9 is a flowchart of the P mode switching processing on the primary site 1a side. This is the processing of S713 in FIG. 8.

In S901, the program determines whether the mode switching of the target pair VOLs is the switching from the asynchronous mode to the synchronous mode or not. When the determination result is true (Yes in S901), the program allows the processing to proceed to S905. Meanwhile, when the determination result is false (No in S901), the program allows the processing to proceed to S903.

In S903, the program generates the P-JVOL corresponding to the target P-VOL.

In S905, the program determines whether the data transfer request of the journal data of the P-JVOL corresponding to the target P-VOL is received from the secondary site 1b or not. When the determination result is true (Yes in S905), the program allows the processing to proceed to S907. Meanwhile, when the determination result is false (No in S905), this processing is repeated.

In S907, the program transfers the journal data in the target P-JVOL to the secondary site 1b. After the transfer of the journal data in the target P-JVOL is completed, the program transmits the transfer completion report to the secondary site 1b.

In S909, the program updates the mode switching management table 400. Specifically, the program changes the mode 413 of the target P-VOL in the mode switching management table 400 to the mode that is different from the current mode.

By the above-described processing, it is possible to generate the P-JVOL corresponding to the P-VOL when the switching is made from the synchronous mode to the asynchronous mode. At the time of the switching from the asynchronous mode to the synchronous mode, all the journal data left in the P-JVOL can be transmitted to the S-JVOL.

Figure 10:
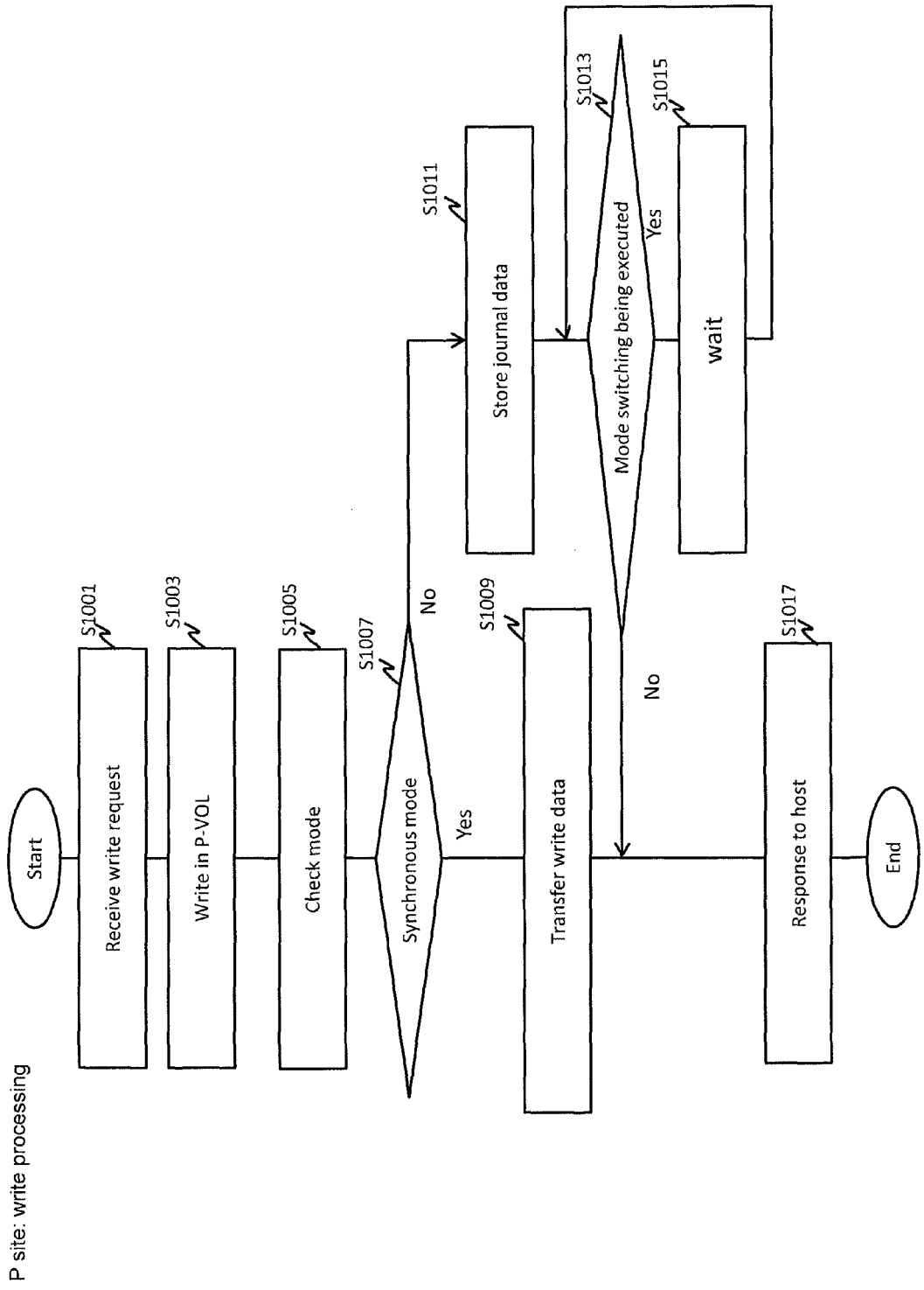
FIG. 10 is a flowchart of write processing in the primary site 1a according to the example 1.

FIG. 10 is a flowchart of write processing in the primary site 1a according to the example 1.

This is the processing in the primary site 1a at the time when the write request specifying the P-VOL is transmitted from the host 2. This processing is executed when the microprocessor 15 of the control apparatus 10 of the primary site 1a executes the write processing program.

In S1001, the program receives the write request and the write data specifying the P-VOL from the host 2. In the following explanation of this flowchart, this P-VOL will be referred to as the target P-VOL.

In S1003, the program writes the write data according to the write request in the target P-VOL.

In S1005, the program checks the mode of the current remote copy of the target P-VOL. Specifically, the program refers to the mode switching management table 400 on the cache memory 16, and acquires the mode 413 corresponding to the target P-VOL, for example.

In S1007, the program determines whether the mode acquired in S1005 is the "synchronous mode" or not.

When the determination result is true (Yes) in S1007, the program transfers the write data in the target P-VOL to the S-VOL (target S-VOL) that forms a pair with the target P-VOL in S1009, and allows the processing to proceed to S1017. Specifically, for example, the program refers to the pair formation table 300 on the cache memory 16, acquires the S-VOL# 303 of the target S-VOL, and transfers the write data by specifying the target S-VOL. Meanwhile, when the determination result is false (No) in S1007, the program allows the processing to proceed to S1011.

In S1011, the program generates the journal data based on the write request and the write data and stores the journal data in the P-JVOL corresponding to the target P-VOL, and in S1013, the program determines whether the P mode switching processing is being executed or not. When the determination result is true (Yes in S1013), the program allows the processing to proceed to S1015 and, after waiting for a predetermined period of time, allows the processing to return to S1013. Meanwhile, when the determination result is false (No in S1013), the program allows the processing to proceed to S1017.

In S1017, the program transmits the response to the write request to the host 2, and terminates the processing.

By the above-described processing, it is possible to execute the write processing according to the synchronous mode or the asynchronous mode. When the mode switching processing is being executed at the time of the asynchronous mode, the response to the write request is not made to the host 2. Thereby, the secondary site 1b does not receive the write data (synchronous data) to the S-VOL at the time of the synchronous mode, until the copy of the journal data from the P-JVOL to the S-JVOL for the switching from the asynchronous mode to the synchronous mode is completed, which makes it possible to maintain consistency of the data in the S-VOL.

Example 2

Hereinafter, the example 2 will be explained. The explanation will be mainly given to the differences from the example 1, and the explanation on the features that are common to the example 1 will be omitted or simplified.

The outline of the remote copy executed by the remote copy system according to the example 2 will be explained. The remote copy system according to this example has a temporary site 1c, in addition to the primary site 1a and the secondary site 1b. The configuration of the temporary site 1c is similar to the configuration of the primary site 1a. The remote copy is executed from the P-VOL#1 of the primary site 1a to the S-VOL#1 of the secondary site 1b.

The remote copy at the time of the synchronous mode is basically similar to that of the example 1 (refer to FIG. 2). The primary site 1a reports to the host 2 that the writing is completed after the writing to the P-VOL#1 and the S-VOL#1 is completed in response to the write request from the host 2. It should be noted that, when the remote copy between the primary site 1a and the secondary site 1b is executed according to the synchronous mode, the operation of the temporary site #1 is not necessary.

Figure 11:
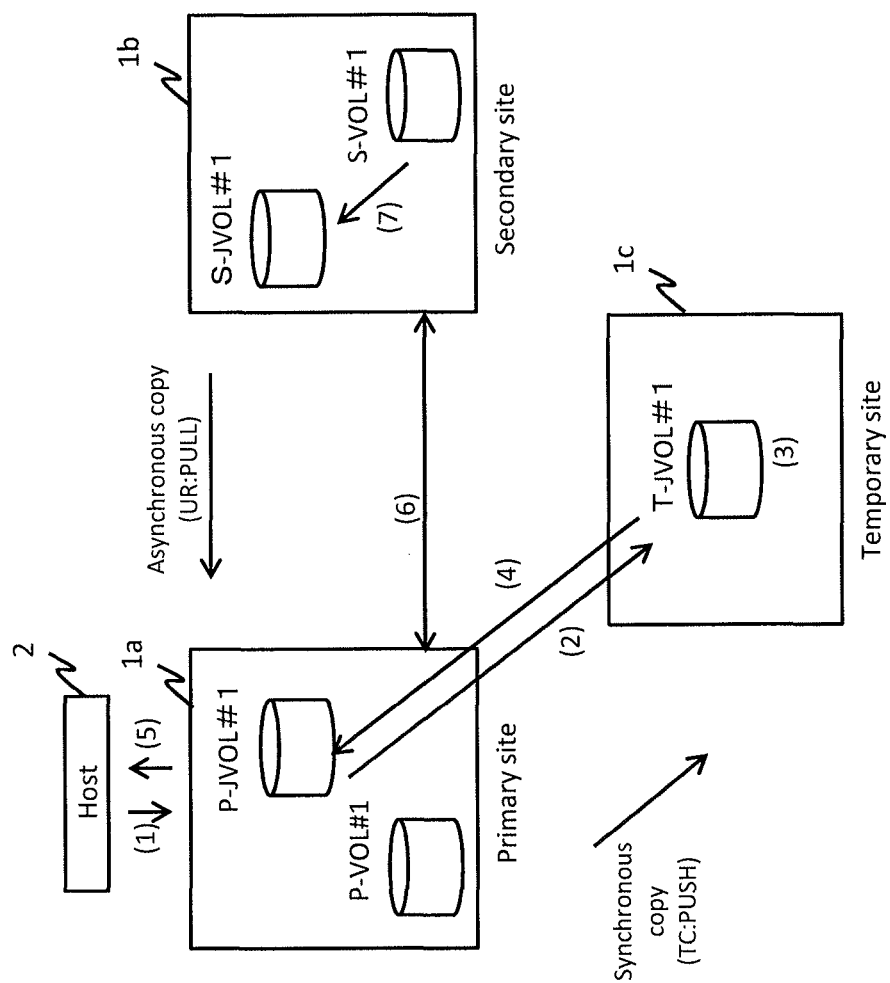
FIG. 11 is a view explaining the remote copy in the remote copy system according to an example 2, at the time of an asynchronous mode.

FIG. 11 is a view explaining the remote copy at the time of the asynchronous mode, in the remote copy system according to the example 2.

When the remote copy between the P-VOL#1 in the primary site 1a and the S-VOL#1 in the secondary site 1b is executed according to the asynchronous mode, the primary site 1a executes synchronous copy from the journal volume P-JVOL#1 that is associated with the P-VOL#1 to the temporary site. The explanation will be made specifically.

(1) When receiving the write request specifying the P-VOL#1 from the host 2, the primary site 1a writes the write data in the P-VOL#1, and also writes the journal data, which is the write data added with the control information, in the journal volume P-JVOL#1 associated with the P-VOL#1.

(2) The primary site 1a transfers the journal data that is written in the P-JVOL#1 to the temporary site 1c.

(3) The temporary site 1c writes the received journal data in a journal volume T-JVOL#1.

(4) The temporary site 1c transmits the write completion report of the journal data in the T-JVOL#1 to the primary site 1a.

(5) The primary site 1a receives the write completion report and transmits the report to the effect that the writing of the write data is completed to the host 2.

(6) Meanwhile, the secondary site 1b transmits the data transfer request to the primary site 1a at the predetermined timing, reads the journal data written in the P-JVOL#1, and writes it in the journal volume S-JVOL#1 that is associated with its own S-VOL#1.

(7) Based on the journal data written in the S-JVOL#1, the secondary site 1b updates the S-VOL#1.

Figure 12:
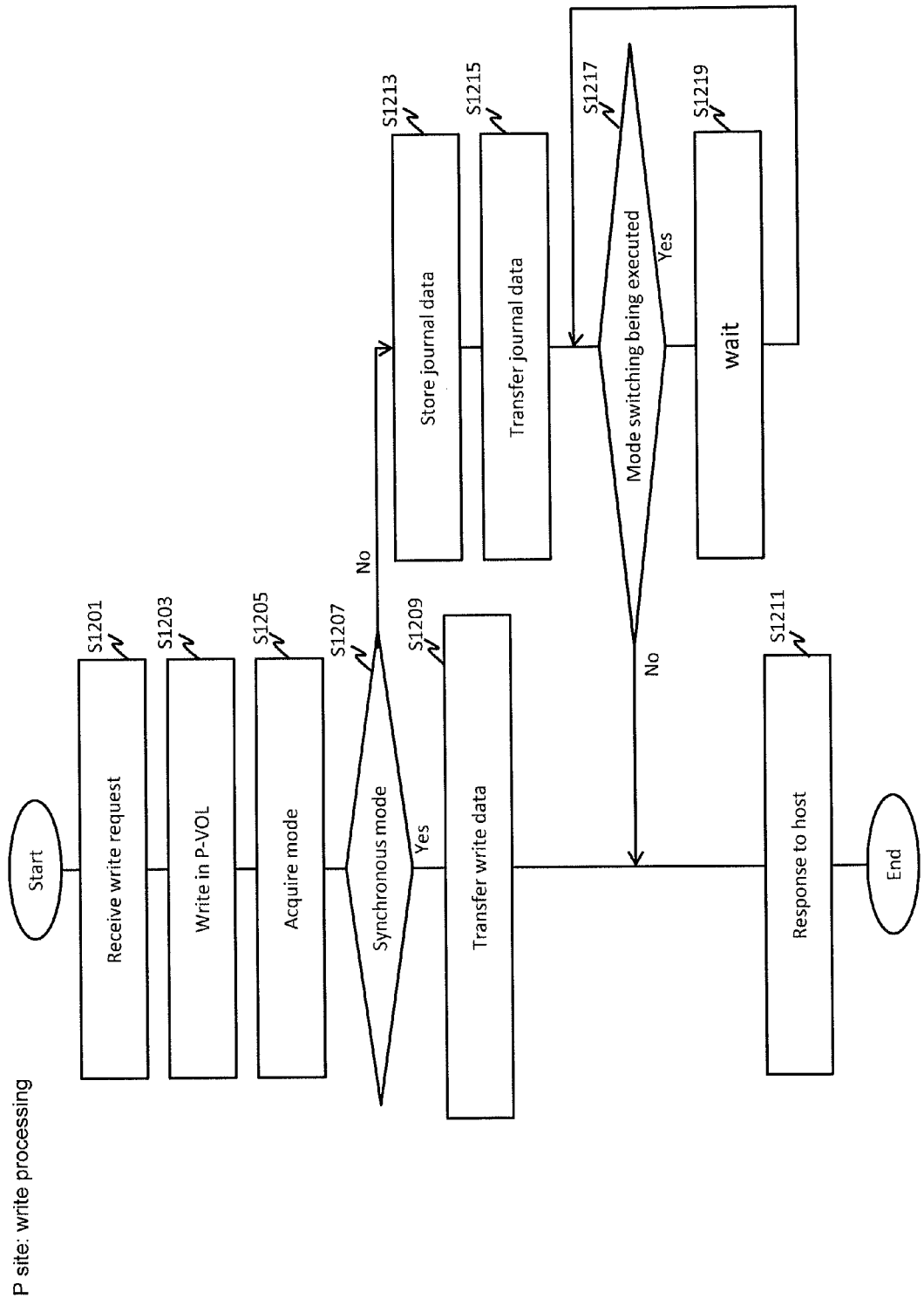
FIG. 12 is a flowchart of the write processing in the primary site 1a according to the example 2.

FIG. 12 is a flowchart of the write processing in the primary site 1a according to the example 2.

This is the processing in the primary site 1a at the time when the write request specifying the P-VOL is transmitted from the host 2. This processing is executed when the microprocessor 15 of the control apparatus 10 of the primary site 1a executes the write processing program.

In S1201, the program receives the write request and the write data specifying the P-VOL from the host 2. In the following explanation of this flowchart, this P-VOL will be referred to as the target P-VOL and this write data is referred to as the target write data.

In S1203, the program writes the target write data in the target P-VOL.

In S1205, the program acquires the current mode of the target P-VOL. Specifically, the program refers to the mode switching management table 400 on the cache memory 16, and acquires the mode 413 corresponding to the target P-VOL, for example.

In S1207, the program determines whether the mode acquired in S1205 is the "synchronous mode" or not.

When the determination result is true (Yes) in S1207, the program transfers the write data in the target P-VOL to the S-VOL (target S-VOL) that forms a pair with the target P-VOL in S1209, and allows the processing to proceed to S1211. Specifically, for example, the program refers to the pair formation table 300 on the cache memory 16, acquires the S-VOL# 303 of the target S-VOL, and transfers the target write data by specifying the target S-VOL.

Meanwhile, when the determination result is false (No) in S1207, the program generates the journal data based on the target write data, and stores the journal data in the P-JVOL corresponding to the target P-VOL, in S1213.

In S1215, the program transfers the journal data in the target P-JVOL to the journal volume (T-JVOL) of the temporary site 1c corresponding to the target P-JVOL.

In S1217, the program determines whether the mode switching processing is being executed or not. When the determination result is true (Yes in S1217), the program allows the processing to proceed to S1219 and, after waiting for a predetermined period of time, allows the processing to return to S1217. Meanwhile, when the determination result is false (No in S1217), the program allows the processing to proceed to S1211.

In S1211, the program transmits the response to the write request to the host 2, and terminates the processing.

By the above-described processing, it is possible to execute the write processing according to the synchronous mode or the asynchronous mode. At the time of the asynchronous mode, the journal data based on the write data is stored in the target P-JVOL and also transmitted to the T-JVOL of the temporary site 1c. Thereby, the temporary site 1c can generate the T-JVOL that is the volume having the same contents as those of the target P-JVOL.

Incidentally, the temporary site 1c may generate the journal volume T-JVOL when the first journal data is transmitted from the primary site 1a, such as when the switching is made from the synchronous mode to the asynchronous mode. Then, the temporary site 1c stores the journal data in the T-JVOL every time the journal data is transmitted from the primary site 1a.

It is possible for the remote site according to this example to guarantee the response time of the P-VOL by executing the appropriate mode switching. Further, based on the primary load information that is measured on the primary site 1a side and the secondary load information that is measured on the secondary site 1b side, it is possible to appropriately judge the pair VOLs that require the mode switching.

In addition, the remote copy system according to this example has the temporary site 1c and, when the mode of the remote copy of the pair VOLs is switched from the synchronous mode to the asynchronous mode, the T-JVOL that is in synchronous with the P-JVOL of the primary site 1a is generated in the temporary site 1c. Thereby, even when a malfunction is caused in the primary site 1a, and the journal data of the P-JVOL cannot be reflected on the S-JVOL, for example, the S-VOL can be updated to the latest condition by reflecting the journal data of the T-JVOL on the S-JVOL. Thus, the switching can be made from the primary site 1a, in which the malfunction is caused, to the secondary site 1b.

Incidentally, when the mode of the pair VOLs returns from the asynchronous mode to the synchronous mode, the synchronization of the S-VOL can be made by the P-JVOL of the primary site 1a. Therefore, the T-JVOL can be discarded in this case.

Hereinafter, it is supposed that the malfunction is caused in the primary site 1a, for example, and the main site is switched from the primary site 1a to the secondary site 1b. In this case, the data of the T-JVOL is reflected on the S-VOL so as to update the S-VOL as the target to the latest condition. In the following explanation, this S-VOL is referred to as the target S-VOL.

Figure 13:
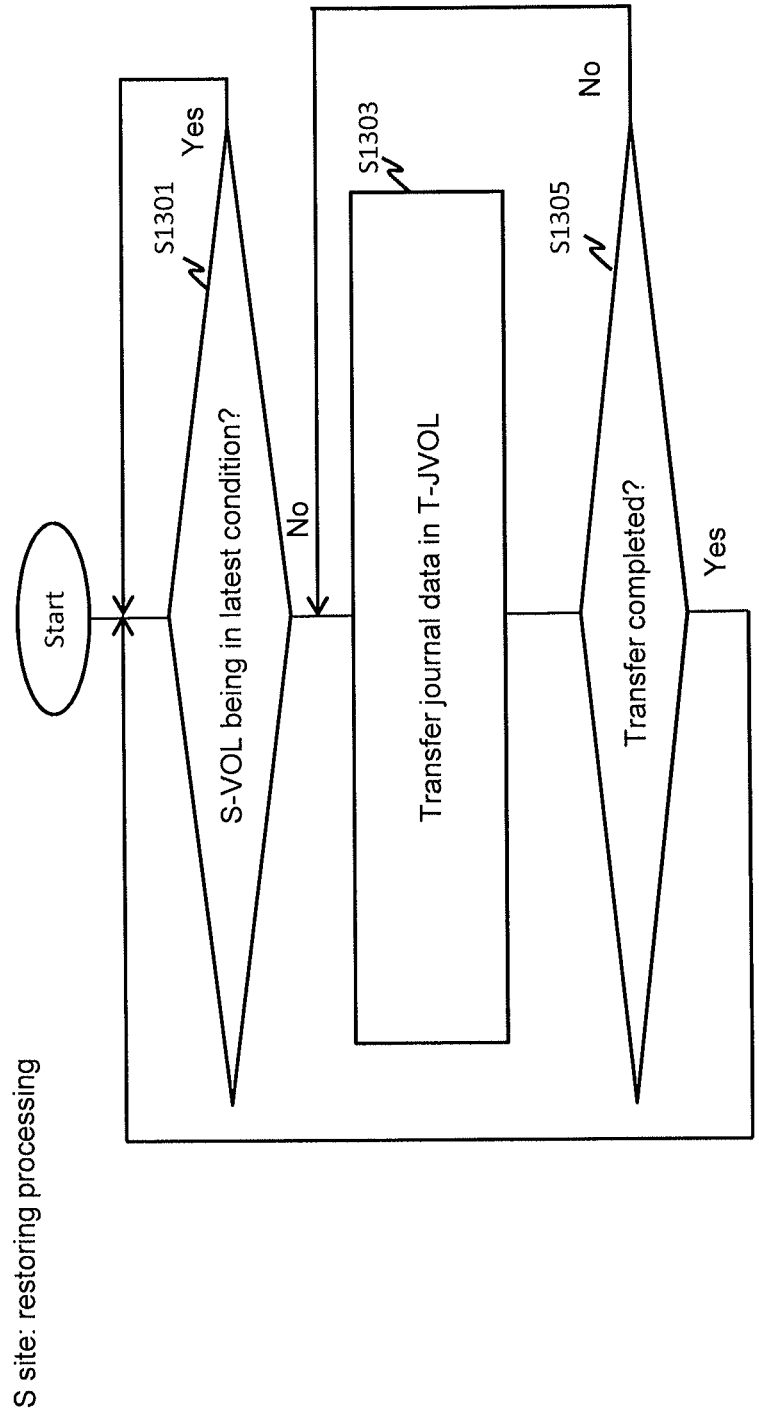
FIG. 13 is a flowchart of restoring processing of an S-VOL.

FIG. 13 is a flowchart of processing for updating the S-VOL to the latest condition. This processing is executed when the microprocessor 15 of the control apparatus 10 of the temporary site 1c executes an update processing program.

In S1301, the program determines whether the target S-VOL is in the latest condition or not. Information about whether the S-VOL is in the latest condition or not may be reported, for example, directly from the secondary site 1b or via the primary site 1a. When the determination result is true (Yes in S1301), the program repeats the processing of S1301. Meanwhile, when the determination result is false (No in S1301), the program allows the processing to proceed to S1303.

In S1303, the program specifies the target S-VOL and transfers the journal data in the T-JVOL to the secondary site 1b. Then, the program reflects the transferred journal data on the S-JVOL.

In S1305, the program determines whether the transfer of the journal data is completed or not. When the determination result is true (Yes in S1305), the program repeats the processing of S1301, after a predetermined period of time. Meanwhile, when the determination result is false (No in S1305), the program allows the processing to return to S1303.

By the above-described processing, the journal data in the T-JVOL is reflected on the S-JVOL, so as to update the target S-VOL to the latest condition. Thus, the secondary site 1b can be operated as the main site, instead of the primary site 1a in which the malfunction is caused.

Example 3

Hereinafter, the example 3 will be explained. The explanation will be mainly given to the differences from the example 1, and the explanation on the features that are common to the example 1 will be omitted or simplified.

The outline of the remote copy executed by the remote site according to the example 3 will be explained. According to this example, the remote copy is executed from the P-VOL#1 of the primary site 1a to the S-VOL#1 of the secondary site 1b. At this time, each of the primary site 1a and the secondary site 1b generates the journal volume even at the time of the synchronous mode.

Figure 14:
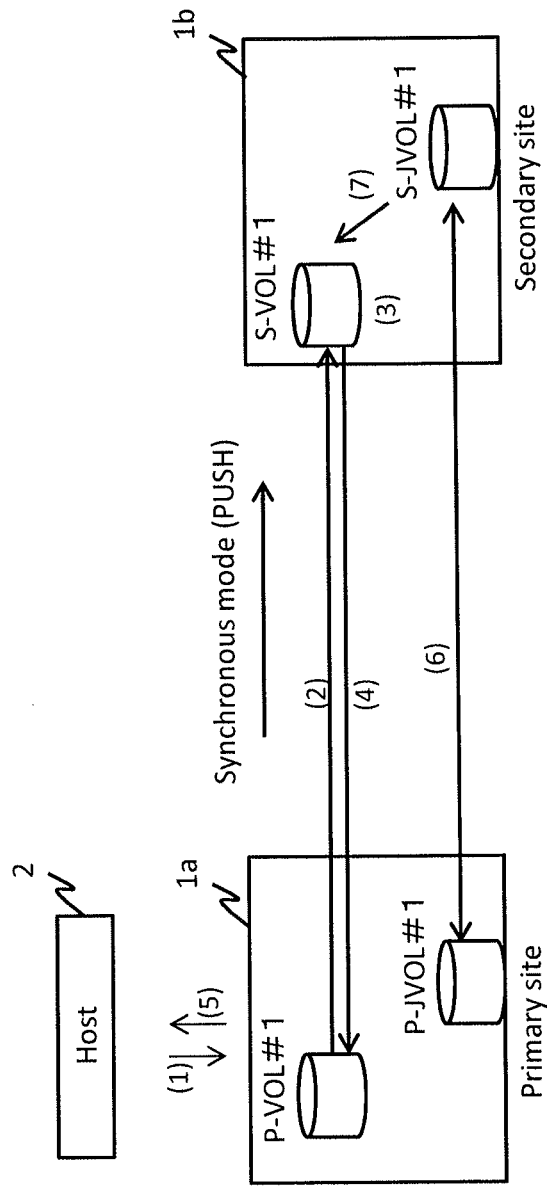
FIG. 14 is a view explaining the remote copy in the remote copy system according to an example 3, at the time of a synchronous mode.

FIG. 14 is a view explaining the remote copy in the remote site according to the example 3, at the time of the synchronous mode.

According to this example, the primary site 1a and the secondary site 1b generate the P-JVOL#1 corresponding to the P-VOL#1 and the S-JVOL#1 corresponding to the S-VOL#1, respectively, in executing the remote copy at the time of the synchronous mode. Then, the primary site 1a stores the write data in the P-VOL#1, and stores the journal data in the P-JVOL#1, according to the write request from the host 2. Specific explanation will be given below.

(1) When receiving the write request specifying the P-VOL#1 from the host 2, the primary site 1a writes the write data in the P-VOL#1, and writes the journal data, which is the write data added with the control information, in the journal volume P-JVOL#1 associated with the P-VOL#1.

(2) The primary site 1a transfers the write data that is written in the P-VOL#1 to the secondary site 1b.

(3) The secondary site 1b receives the write data and writes it in the S-VOL#1.

(4) The secondary site 1b transmits the write completion report of the write data in the S-VOL#1 to the primary site 1a.

(5) The primary site 1a receives the write completion report and transmits the report to the effect that the writing of the write data is completed to the host 2.

(6) Thereafter, the secondary site 1b transmits the data transfer request to the primary site 1a at the predetermined timing, reads the journal data written in the P-JVOL#1, and writes it in the journal volume S-JVOL#1 that is associated with its own S-VOL#1.

(7) Based on the journal data written in the S-JVOL#1, the secondary site 1b updates the S-VOL#1.

FIG. 15 is a flowchart of the write processing in the primary site 1a according to the example 3.

This is the processing in the primary site 1a at the time when the write request specifying the P-VOL is transmitted from the host 2. This processing is executed when the microprocessor 15 of the control apparatus 10 of the primary site 1a executes the write processing program.

In S1501, the program receives the write request and the write data specifying the P-VOL from the host 2. In the following explanation of this flowchart, this P-VOL will be referred to as the target P-VOL and this write data is referred to as the target write data.

In S1503, the program writes the target write data in the target P-VOL.

In S1505, the program generates the journal data based on the target write data, and stores the journal data in the P-JVOL corresponding to the target P-VOL.

In S1507, the program acquires the mode of the current remote copy of the target P-VOL. Specifically, the program refers to the mode switching management table 400 on the cache memory 16, and acquires the mode 413 corresponding to the target P-VOL, for example.

In S1509, the program determines whether the mode acquired in S1507 is the "synchronous mode" or not.

When the determination result is true (Yes) in S1509, the program transfers the write data in the target P-VOL to the S-VOL (target S-VOL) that forms a pair with the target P-VOL in S1511, and allows the processing to proceed to S1513. Specifically, for example, the program refers to the pair formation table 300 on the cache memory 16, acquires the S-VOL# 303 of the target S-VOL, and transfers the target write data by specifying the target S-VOL.

Meanwhile, when the determination result is false (No) in S1509, the program determines whether the mode switching processing is being executed or not in S1515. When the determination result is true (Yes in S1515), the program allows the processing to proceed to S1517 and, after waiting for a predetermined period of time, allows the processing to return to S1515. Meanwhile, when the determination result is false (No in S1515), the program allows the processing to proceed to S1513.

In S1513, the program transmits the response to the write request to the host 2, and terminates the processing.

By the above-described processing, it is possible to execute the write processing according to the synchronous mode or the asynchronous mode. In addition, as the journal data is stored in the P-JVOL even at the time of the synchronous mode, it is possible to execute switching of I/O immediately when the switching is made from the synchronous mode to the asynchronous mode. Moreover, even when the storage system 1, other than the secondary site 1b, is coupled to the primary site 1a, it is allowed to function as the remote site in the asynchronous mode.

It should be noted that, according to this example, the remote copy system may be further provided with the temporary site 1c that is coupled to the primary site 1a and the secondary site 1b, for example. When the switching is made from the synchronous mode to the asynchronous mode, for example, the temporary site 1c generates the T-JVOL#1 and 2 as backup volumes corresponding to the P-JVOL. According to this example, the P-JVOL is generated regardless of the synchronous mode and the asynchronous mode, and the primary site 1a transmits the journal data in the asynchronous mode, in the P-VOL, to the temporary site 1c according to the synchronous mode, for example. Further, the primary site 1a transmits the journal data in the synchronous mode, in the P-VOL, to the temporary site 1c according to the asynchronous mode. The temporary site 1c stores the journal data in the synchronous mode in the T-JVOL#1, and stores the journal data in the asynchronous mode in the T-JVOL#2, for example. Thereby, when the malfunction of the secondary site 1b is caused, the temporary site 1c generates the S-VOL based on the T-JVOL#1 and the T-JVOL#2, so that the temporary site 1c can substitute for the secondary site 1b.

Although several examples have been explained thus far, it is needless to say that the present invention is not limited to these examples, and that various changes may be made within the scope disclosed herein.

For example, in the above-described several examples, the mode of the remote copy is set for each pair VOLs formed by the P-VOL of the primary site and the S-VOL of the secondary site, but this is not restrictive. For example, the mode of the remote copy may be set for each of VOL groups that is configured by a plurality of P-VOLs and a plurality of S-VOLs.

In the above-described several examples, a first storage apparatus corresponds to the primary site 1a and the like, a second storage apparatus corresponds to the secondary site 1b, and a third storage apparatus corresponds to the temporary site 1c and the like. Further, a first data volume corresponds to the P-VOL#1, and a second data volume corresponds to the S-VOL#1. Furthermore, a first journal volume corresponds to the P-JVOL#1, a second journal volume corresponds to the S-JVOL#1, and a third journal volume corresponds to the T-JVOL#1.

REFERENCE SIGNS LIST

1 Storage system
1a Primary site
1b Secondary site
1c Temporary site
10 Control apparatus
20 Storage apparatus

The invention claimed is:
1. A backup system comprising:
a first storage apparatus that is configured to be coupled to a host computer and to have a first data volume; and
a second storage apparatus that is configured to be coupled to the first storage apparatus and to have a second data volume, wherein
the first storage apparatus is configured to store mode information representing a mode of a backup copy from the first data volume to the second data volume, copy write data from the first data volume to the second data volume in synchronous with a write request when the mode information represents a synchronous mode, and generate journal data based on the write data when the mode information represents an asynchronous mode,
the second storage apparatus is configured to store the mode information, receive the write data from the first storage apparatus and write the write data in the second data volume when the mode information represents the synchronous mode, and acquire the journal data from the first storage apparatus in asynchronous with the write request and reflect the journal data on the second data volume when the mode information represents the asynchronous mode,
the second storage apparatus is configured to acquire secondary load information representing its own load status and transmit the information to the first storage apparatus,
the first storage apparatus is configured to acquire primary load information representing its own load status,
determine switching between the modes based on the secondary load information, the primary load information, and the mode information, and
transmit determination information representing determination results to the second storage apparatus, and
the second storage apparatus is configured to receive the determination information, and acquire the journal data from the first storage apparatus and reflect the journal data on the second data volume when the determination information represents the switching from the asynchronous mode to the synchronous mode, wherein
when the mode information represents the synchronous mode, the first storage apparatus is configured to write the write data in the first data volume according to the write request, transmit the write data in the first data volume to the second data volume, and report to the host computer that the writing of the write data is completed after the second storage apparatus writes the write data in the second data volume, and
when the mode information represents the asynchronous mode, the first storage apparatus is configured to write the write data in the first data volume, write the journal data, as the write data added with update information, in a first journal volume associated with the first data volume, and report to the host computer that the writing of the write data is completed, and
the second storage apparatus is configured to acquire the journal data from the first storage apparatus in asynchronous with the write request, and reflect the journal data on the second data volume, wherein
when the determination information represents the switching from the asynchronous mode to the synchronous mode, the second storage apparatus is configured to transmit a transfer request of the journal data to the first storage apparatus,
the first storage apparatus is configured to transmit the journal data in the first journal volume to the second storage apparatus, in response to the transfer request,
the second storage apparatus is configured to reflect the transmitted journal data on the second data volume, and
the first storage apparatus is configured to change the mode information to the synchronous mode, wherein
the first storage apparatus is configured to store the write data according to the write request in the first data volume, store the journal data, as the write data added with the update information, in the first journal volume associated with the first data volume when receiving the write request specifying the first data volume from the host computer and when the mode information represents the asynchronous mode; and when the mode information is not changed to the synchronous mode after determination is made that the switching from the asynchronous mode to the synchronous mode is made, report to the host computer that the writing of the write data is completed, after the mode information is changed to the synchronous mode, wherein the primary load information comprises a first response time as a time from when the write request is made until when a response to the host computer is made in the synchronous mode, and the first storage apparatus is configured to measure the first response time and, when the first response time exceeds a predetermined threshold value, determine that the synchronous mode is switched to the asynchronous mode, wherein the first storage apparatus is configured to estimate a second response time as a time from when the write request is made until when the response to the host computer is made, on the supposition that the synchronous mode is employed, based on the secondary load information in the asynchronous mode, and determine that the asynchronous mode is switched to the synchronous mode when the second response time is less than a predetermined threshold value, wherein the secondary load information comprises a data transfer time from the first storage apparatus to the second storage apparatus, wherein the first storage apparatus is configured to have a first processor, and to determine that the asynchronous mode is switched to the synchronous mode when an operating rate of the first processor is less than a predetermined threshold value, and wherein the first storage apparatus is configured to determine that the asynchronous mode is switched to the synchronous mode when an elapsed time from when the mode is switched lastly is less than a predetermined threshold value, in the asynchronous mode.

2. The backup system according to claim 1, wherein the second storage apparatus is configured to have a second processor, to measure a data transfer amount speed from the first data volume to the second data volume, an I/O (Input or Output) frequency of the second data volume, and an operating rate of the second processor, and calculate the data transfer time based on the data transfer amount, the I/O frequency and the operating rate of the second processor.

3. The backup system according to claim 1, further comprising a third storage apparatus configured to be coupled to the first storage apparatus, wherein the third storage apparatus is configured to generate a third journal volume corresponding to the first journal volume, the first storage apparatus is configured to store the write data in the first volume in response to the write request, and to store the journal data, as the write data added with the update information, in the first journal volume and transmit the data to the third storage apparatus, and the third storage apparatus is configured to receive the journal data from the first storage apparatus and to write the received journal data in the third journal volume.

4. The backup system according to claim 1, wherein the first storage apparatus is configured to store the write data according to the write request in the first data volume, write the journal data, as the write data added with the update information, in the first journal volume, and transmit the write data to the second data volume, when the synchronous mode is employed.

5. A backup method of data executed by a backup system including a first storage apparatus that is coupled to a host computer and has a first data volume, and a second storage apparatus that is coupled to the first storage apparatus and has a second data volume, the backup method comprising:

operating the first storage apparatus to store mode information representing a mode of a backup copy from the first data volume to the second data volume, and operating the second storage apparatus to store the mode information;

operating the first storage apparatus to copy write data from the first data volume to the second data volume in synchronous with a write request, and operating the second storage apparatus to receive the write data from the first storage apparatus and write the data in the second data volume, when the mode information represents the synchronous mode;

operating the first storage apparatus to generate journal data based on the write data and operating the second storage apparatus to acquire the journal data from the first storage apparatus in asynchronous with the write request, and reflect the journal data on the second data volume, when the mode information represents an asynchronous mode;

operating the second storage apparatus to acquire secondary load information representing its own load status and transmit the information to the first storage apparatus;

operating the first storage apparatus to acquire primary load information representing its own load status;

operating the first storage apparatus to determine switching between the modes based on the secondary load information, the primary load information, and the mode information;

operating the first storage apparatus to transmit determination information representing determination results to the second storage apparatus;

operating the second storage apparatus to receive the determination information, and acquire the journal data from the first storage apparatus, when the determination information represents the switching from the asynchronous mode to the synchronous mode; and operating the second storage apparatus to reflect the journal data on the second data volume, wherein when the mode information represents the synchronous mode, operating the first storage apparatus to write the write data in the first data volume according to the write request, transmitting the write data in the first data volume to the second data volume, and reporting to the host computer that the writing of the write data is completed after the second storage apparatus writes the write data in the second data volume, and when the mode information represents the asynchronous mode, operating the first storage apparatus to write the write data in the first data volume, writing the journal data, as the write data is added with update information, in a first journal volume associated with the first data volume, and reporting to the host computer that the writing of the write data is completed, and operating the second storage apparatus to acquire the journal data from the first storage apparatus in asynchronous with the write request, and reflecting the journal data on the second data volume, wherein when the determination information represents the switching from the asynchronous mode to the synchronous mode, operating the second storage apparatus to transmit a transfer request of the journal data to the first storage apparatus, operating the first storage apparatus to transmit the journal data in the first journal volume to the second storage apparatus, in response to the transfer request, operating the second storage apparatus to reflect the transmitted journal data on the second data volume, and operating the first storage apparatus to change the mode information to the synchronous mode, wherein operating the first storage apparatus includes storing the write data according to the write request in the first data volume, storing the journal data, as the write is data added with the update information, in the first journal volume associated with the first data volume when receiving the write request specifying the first data volume from the host computer and when the mode information represents the asynchronous mode; and when the mode information is not changed to the synchronous mode after determination is made that the switching from the asynchronous mode to the synchronous mode is made, reporting to the host computer that the writing of the write data is completed, after the mode information is changed to the synchronous mode, wherein the primary load information comprises a first response time as a time from when the write request is made until when a response to the host computer is made in the synchronous mode, and operating the first storage apparatus to measure the first response time and, when the first response time exceeds a predetermined threshold value, determining that the synchronous mode is switched to the asynchronous mode, wherein operating the first storage apparatus includes estimating a second response time as a time from when the write request is made until when the response to the host computer is made, on the supposition that the synchronous mode is employed, based on the secondary load information in the asynchronous mode, and determining that the asynchronous mode is switched to the synchronous mode when the second response time is less than a predetermined threshold value, wherein the secondary load information comprises a data transfer time from the first storage apparatus to the second storage apparatus, wherein the first storage apparatus is configured to have a first processor, and determining that the asynchronous mode is switched to the synchronous mode when an operating rate of the first processor is less than a predetermined threshold value, and wherein the first storage apparatus is configured to determine that the asynchronous mode is switched to the synchronous mode when an elapsed time from when the mode is switched lastly is less than a predetermined threshold value, in the asynchronous mode.

* * * * *